006
United States Patent [19]

Robertson

[11] 4,151,678
[45] May 1, 1979

[54] DUCK CALLER

[76] Inventor: Phil A. Robertson, Rte. 6, Box 192X, Luna, La. 71291

[21] Appl. No.: 799,505

[22] Filed: May 23, 1977

[51] Int. Cl.² .............................................. A63H 5/00
[52] U.S. Cl. ...................................... 46/180; 84/350; 84/363
[58] Field of Search .................... 46/180, 181; 84/350, 84/363

[56] References Cited

U.S. PATENT DOCUMENTS

| | | | |
|---|---|---|---|
| 2,405,850 | 8/1946 | Roberts | 84/363 X |
| 2,493,472 | 1/1950 | Yentzen | 46/180 |
| 2,518,616 | 8/1950 | Herter | 46/180 |
| 2,544,370 | 3/1951 | Walter | 46/180 |
| 2,729,025 | 1/1956 | Jones | 46/180 |
| 2,928,208 | 3/1960 | Wintriss | 46/180 |
| 3,020,675 | 2/1962 | Boecker | 46/180 |

Primary Examiner—Louis G. Mancene
Assistant Examiner—Mickey Yu
Attorney, Agent, or Firm—Peter J. Murphy

[57] ABSTRACT

A tubular blowing tube receives a generally cylindrical sounding barrel in one end. A longitudinal notch extending from the inner end of the sounding barrel defines a flat support surface for a pair of reeds. An axial bore opening from the outer end of the sounding barrel merges with a longitudinal axial groove opening to the support surface and terminating short of the inner end of the barrel. The reeds overlie the groove and are retained at the base end of the groove by a cork member compressed between the barrel and blowing tube. The support surface is convex at the inner end where the groove terminates; and the reed tips are bent away from the convex surface and slightly spaced from each other.

14 Claims, 4 Drawing Figures

4,151,678

DUCK CALLER

BACKGROUND AND SUMMARY OF THE INVENTION

This invention relates to a duck calling device to be sounded by blowing through the device.

A principal object of this invention is to provide a duck caller of novel construction and configuration to produce an effective calling sound.

Another object of this invention is to provide a duck caller including a pair of reeds disposed in overlying relation to each other.

A further object of this invention is to provide a duck caller having a unique relationship and configuration of a pair of reeds and a sounding barrel.

Still another object of this invention is to provide a duck caller to produce the perfect simulated call of the mallard hen.

A still further object of this invention is to provide such a duck caller of simple construction for ease of assembly and minor adjustment.

These objects are accomplished in a duck caller which comprises a blowing tube having a generally cylindrical bore and an elongated generally cylindrical sounding barrel partially received within said blowing tube. The sounding barrel has a notch extending longitudinally from its inner end to a base thereof, defining a generally flat reed support surface. The sounding barrel also has a generally axial bore extending from its outer end, opening laterally to the notch to define a groove therein, and terminating adjacent to the inner end of the barrel. Inner and outer flat reeds are disposed in overlying relation on the support surface and have a width to span the groove. The reeds have their tips ends disposed adjacent to the inner end of the barrel and bent away from the support surface, with the tip ends being spaced slightly from each other. A yieldable retainer disposed at the base of the notch is confined by the blowing tube to retain the reeds in fixed relation to the sounding barrel.

More particularly, the reed support surface is convex at its inner end, with the groove terminating in the area of the convex surface, and with the end of the inner reed being spaced from the convex surface at the inner end of the groove.

The novel features and the advantages of the invention as well as additional objects thereof, will be understood more fully from the following description when read in connection with the accompanying drawings.

DRAWINGS

DESCRIPTION OF THE PREFERRED EMBODIMENT

Figure 1:
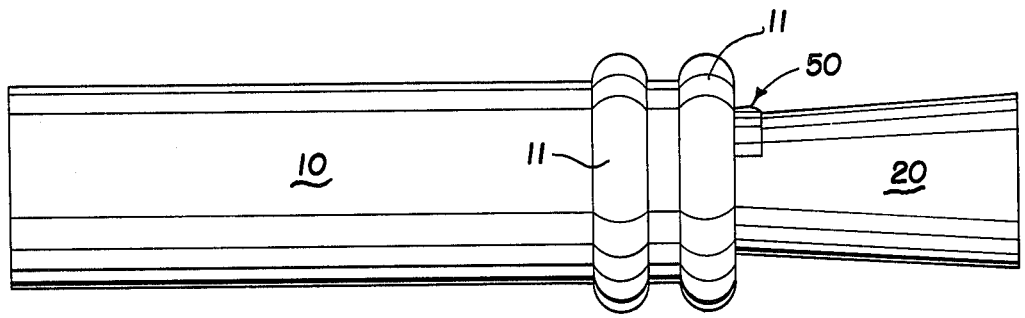
FIG. 1 is a side view of a duck caller according to the invention.
Figure 2:
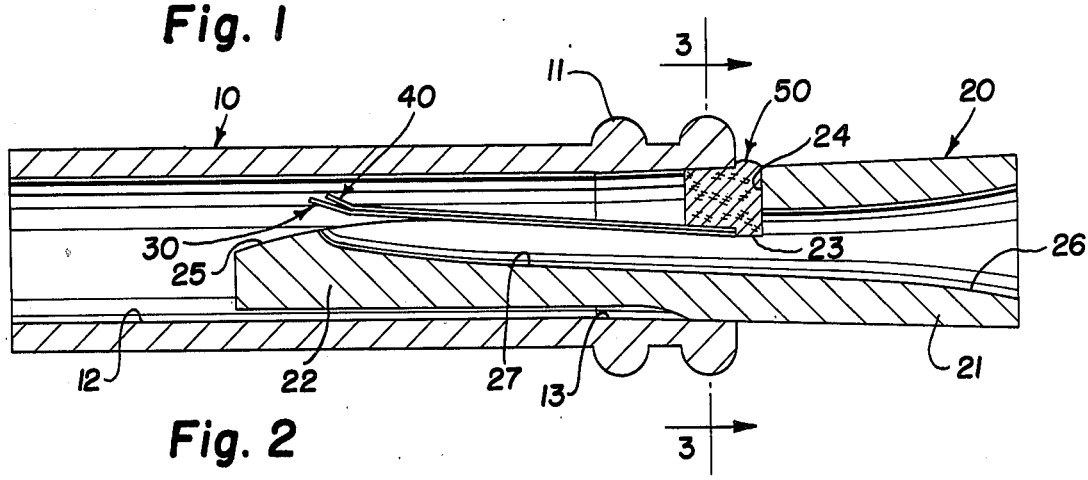
FIG. 2 is a longitudinal sectional view of the duck caller of FIG. 1.

The drawings illustrate a preferred form of duck caller according to the invention which consists of a blowing tube 10, a sounding barrel 20, inner and outer reeds 30 and 40 respectively, and a yieldable retainer 50 which is compressed between the blowing tube and sounding barrel to retain the reeds in selected relation to the sounding barrel.

The blowing tube 10 is a generally cylindrical tubular member which may be fabricated from wood, such as cedar wood for example, or from metal or a plastic material. The tube is provided with a pair of external annular beads 11, at the inner or seating end, which may be provided simply for a pleasing appearance or may enable easier gripping of the tube for assembly and disassembly of the caller. The bore 12 of the blowing tube is cylindrical through most of its length, but diverges outwardly slightly at seating end to provide the seating taper 13, to seat the sounding barrel 20.

The sounding barrel 20 is also a cylindrical member, but only in a very general way; and may be fabricated of wood, such as oak for example, or from metal or a plastic material. The exterior surface of the outer end portion 21 of the sounding barrel is slightly tapered, converging from the outer end with the taper corresponding to the seating taper 13. The inner end portion 22 is smaller in diameter so as not to interfere with the bore 12. The inner end portion 22 is provided with a longitudinal notch or cutout which extends from the inner end of the sounding barrel defining a generally flat reed support surface 23 and terminating in a transverse base surface 24 intermediate the ends. The reed support surface 23 is flat or planar through most of its length extending from the base 24, but includes a convex portion 25 adjacent to the inner end of the sounding barrel. A sounding chamber is defined by a generally axial bore extending from the outer end of the sounding barrel, including a bell mouth portion 26 opening to the outer end of the barrel and an inner portion 27 opening laterally to the reed support surface 23 and thereby defining a longitudinal groove in that surface. This groove 27 terminates short of the inner end of the barrel at the concave portion 25 of the support surface.

The reeds 30 and 40 may be fabricated from any suitable material, such as a polyethelene plastic material for example having a thickness of about 0.025 inches. The reed material should be stiff yet resilient, and should be pliable to the extent that the tip ends may be bent at a selected angle and will hold the bends.

Figure 3:
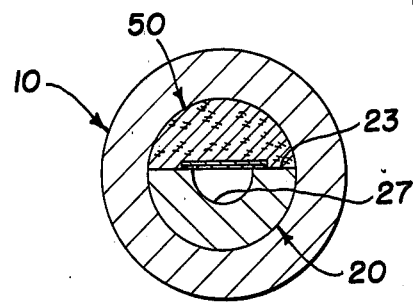
FIG. 3 is a transverse sectional view taken in the plane 3—3 of FIG. 2.
Figure 4:
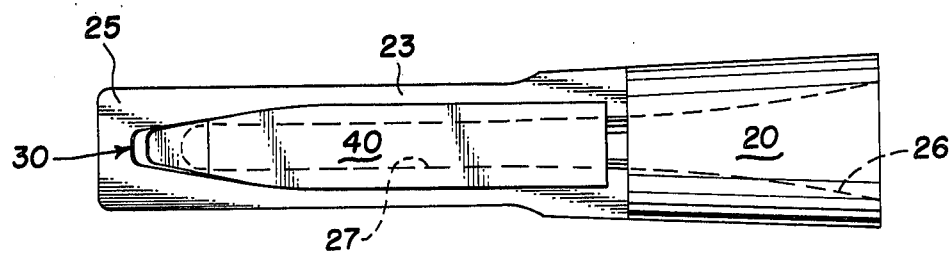
FIG. 4 is a top view of the sounding barrel component and reeds disassembled from the assembly of FIG. 1.

As best seen in FIGS. 3 and 4, the reeds 30 and 40 are substantially wider than the groove 27 at the support surface so they they are well supported on the support surface; and the reeds are rigidly retained on a support surface by the retainer 50 which is preferably fabricated from cork or a similar yieldable material. As seen in the drawings the cork retainer is generally semi-cylindrical in cross-section and when the caller is assembled the retainer is compressed by the seating taper 13 and forms over the inner ends of the reeds to securely clamp these reed inner ends against the support surface.

As seen, the outer or tip ends of the reeds 30 and 40 overlie the convex surface at the inner end of the sounding barrel; and the reed tips extend beyond the inner end of the groove 27. The convex surface 25 then provides a space between the reeds and the support surface at the inner end of the groove. Additionally, the reed tips are bent outward or away from the convex surface, with the tip of the inner reed 30 being bent at an angle of about 15° for example, and with the tip of the outer reed 40 being bent at a very slightly larger angle to provide a slightly diverging space between the reed tips. Additionally, the tip of the outer reed 40 is spaced slightly from the tip of the inner reed toward the groove base 24.

By way of example, a duck caller as described above may have the following dimensions. The length of the blowing tube may be about 3¼ inches and the length of the sounding barrel may be about 3½ inches with the assembled length of the caller being about 4½ inches. The outer diameter of the blowing tube body may be about ⅞ inch for example with the diameter of the cylindrical bore 12 being about ⅝ inch. The planar portion 23 of the reed support surface may extend about 1½ inches from the notch base 24, with the convex portion 25 extending about 1 inch. The inner end of the groove 27 may be about ⅜ inch from the inner end of the sounding barrel; and the tip of the inner reed 30 may be about 3/16 inch from the inner end of the barrel. The groove 27 may have a width of about ¼ inch, at the support surface 23; and the reeds may have a general width of about ½ inch over most of their length which may be about 2 inches. The tip end portions of the reeds are tapered inwardly, reducing in width to substantially flatted tips having a width of about 3/16 inch. The tapered end portions comprise about ½ inch of the reed lengths. The bent portions of the reed tip ends may extend about 3/16 inch from the tips. It is important that the bent tip ends of the inner and outer reeds be spaced slightly from each other, and that the outer end of the reeds be spaced from the inner end of the groove 27 as provided by the convex surface 25.

A duck caller as described herein can simulate, nearly perfectly, the call of the mallard hen. To produce the precisely desired sound, slight longitudinal adjustment of the reeds relative to each other or relative to the sounding barrel is readily accomplished, by disassembly and reassembly of the caller.

While the preferred embodiment of the invention has been illustrated and described, it will be seen by those skilled in the art that changes and modifications may be resorted to without departing from the spirit and scope of the invention.

What is claimed is:

1. A duck caller comprising
a blowing tube having a through bore, and an elongated sounding barrel partially received within said blowing tube;
said sounding barrel having a notch, extending longitudinally from its inner end to a base thereof, and defining a generally flat reed support surface; said sounding barrel having a generally axial bore extending from its outer end, opening laterally to said reed support surface to define a groove therein, and terminating adjacent to the inner end of said barrel;
inner and outer generally flat reeds, having base ends and tip ends disposed in overlying relation on said support surface, said reeds having a width to span said groove; said reeds having their tip ends disposed adjacent to the inner end of said barrel and bent away from the principal planes of said reeds, with the tip ends of said reeds being spaced slightly from each other;
a retainer disposed at the base of said notch for retaining the base ends of said reeds in fixed relation to said sounding barrel.

2. A duck caller as set forth in claim 1
said reed support surface being convex at the inner end thereof, thereby falling away from its principal plane; and said groove terminating in the area of said convex surface.

3. A duck caller as set forth in claim 2
the end of said inner reed being spaced from said convex surface adjacent to the inner end of said groove.

4. A duck caller as set forth in claim 2
said outer reed being disposed in overlying relation to said inner reed, with the bent tip of said outer reed diverging slightly from the bent tip of said inner reed.

5. A duck caller as set forth in claim 2
said convex surface extending about one inch from the inner end of said sounding barrel; said groove terminating about ⅜ inch from the inner end of said sounding barrel; the outer end of said inner reed being spaced about 3/16 inch from the inner end of said sounding barrel.

6. A duck caller as set forth in claim 2
said tip end of said inner reed being disposed between the inner end of said barrel and said groove; and said tip end of said outer reed being spaced slightly further from the inner end of said barrel.

7. A duck caller as set forth in claim 1
said reeds being flat members having a common, uniform thickness.

8. A duck caller as set forth in claim 1
said reeds being generally planar, with the tip end of said inner reed being bent at an angle of about 15° relative to the principal reed plane, and the tip end of said outer reed being bent at a slightly larger angle.

9. A duck caller as set forth in claim 8
the bent tip end portions of said reeds being about 3/16 inch in length.

10. A duck caller as set forth in claim 1
said groove merging smoothly with the remainder of said bore; and said bore being formed to define a bell mouth at the outer end of said sounding barrel.

11. A duck caller as set forth in claim 1
said blowing tube having a blowing end and a seating end, the bore of said blowing tube being cylindrical and enlarging at the seating end to define a seating taper; the outer end of said sounding barrel having a tapered exterior surface for mating seating engagement with said seating taper; and said retainer comprising a portion of said tapered seating surface for said sounding barrel.

12. A duck caller as set forth in claim 1
the tip end portions of said reeds tapering to a flatted tip of reduced width; said tapered portions of said reeds including said bent tip ends.

13. A duck caller as set forth in claim 1
said retainer being fabricated from a yieldable material.

14. A duck caller as set forth in claim 1
said retainer being confined by said blowing tube to retain said reeds in selected positions relative to said support surface.

* * * * *